(12) United States Patent
Froeschle et al.

(10) Patent No.: US 7,387,331 B2
(45) Date of Patent: Jun. 17, 2008

(54) AIR GUIDING SYSTEM FOR A VEHICLE

(75) Inventors: Mathias Froeschle, Ostfildern (DE); Markus Schulzki, Ludwigsburg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/727,625

(22) Filed: Mar. 27, 2007

(65) Prior Publication Data

US 2007/0236045 A1   Oct. 11, 2007

(30) Foreign Application Priority Data

Mar. 28, 2006   (DE) .................... 10 2006 014 259

(51) Int. Cl.
  *B62D 35/00*   (2006.01)
(52) U.S. Cl. ................ 296/180.5; 180/903; 296/26.12; 296/180.1
(58) Field of Classification Search ................ 105/1.3; 180/903; 244/213; 296/26.01, 26.12, 26.13, 296/180.1, 180.2, 180.3, 180.4, 180.5
See application file for complete search history.

(56) References Cited

U.S. PATENT DOCUMENTS

| | | | | |
|---|---|---|---|---|
| 1,274,986 A | * | 8/1918 | Carolin | 244/213 |
| 1,762,002 A | * | 6/1930 | De Putte | 244/213 |
| 3,791,468 A | * | 2/1974 | Bryan, Jr. | 180/69.2 |
| 4,773,692 A | * | 9/1988 | Schleicher et al. | 296/180.5 |
| 4,925,236 A | * | 5/1990 | Itoh et al. | 296/180.5 |
| 5,013,081 A | * | 5/1991 | Cronce et al. | 296/180.1 |
| 5,120,105 A | * | 6/1992 | Brin et al. | 296/180.5 |
| 5,536,062 A | * | 7/1996 | Spears | 296/180.3 |
| 6,382,708 B1 | * | 5/2002 | Erdelitsch et al. | 296/180.5 |
| 6,672,651 B1 | * | 1/2004 | Shuen | 296/180.5 |
| 2002/0074826 A1 | * | 6/2002 | Presley | 296/180.1 |
| 2007/0001482 A1 | | 1/2007 | Larson | |

FOREIGN PATENT DOCUMENTS

| | | | |
|---|---|---|---|
| DE | 30 19 150 A1 | 11/1981 | |
| DE | 43 05 090 A1 | 8/1994 | |
| DE | 10 2004 030 571 A1 | 1/2006 | |
| DE | 10 2005 030 203 A1 | 1/2007 | |
| EP | 271757 A2 * | 6/1988 | ................ 244/46 |
| JP | 60163773 A * | 8/1985 | ............. 296/180.5 |
| JP | 2-117476 A | 5/1990 | |
| JP | 03000578 A * | 1/1991 | ............. 296/180.1 |
| JP | 03281484 A * | 12/1991 | ............. 296/180.1 |

OTHER PUBLICATIONS

German Office Action dated Dec. 6, 2006 with an English translation of the pertinent portions (Six (6) pages).

* cited by examiner

*Primary Examiner*—D. Glenn Dayoan
*Assistant Examiner*—Paul A Chenevert
(74) *Attorney, Agent, or Firm*—Crowell & Moring LLP

(57) ABSTRACT

An air guiding system for a vehicle, particularly for a passenger car, is arranged in a rear area of the vehicle and has at least one central main air guiding element that can be displaced between a moved-in inoperative position into a moved-out operative position. Lateral auxiliary air guiding elements are displaceable together with the at least one central main air guiding element. The lateral auxiliary air guiding elements can be displaced while enlarging the transverse dimension and while simultaneously enlarging the longitudinal dimension of the main air guiding element or the air guiding system from an also moved-in inoperative position into an also moved-out operative position.

20 Claims, 8 Drawing Sheets

AIR GUIDING SYSTEM FOR A VEHICLE

CROSS REFERENCE TO RELATED APPLICATIONS

This application claims the benefit of priority under 35 U.S.C. § 119 to German Patent Application No. 10 2006 014 259 filed Mar. 28, 2006, the disclosure of which is incorporated herein by reference in its entirety.

BACKGROUND AND SUMMARY OF THE INVENTION

The present invention relates to an air guiding system for a vehicle particularly for a passenger car, which is arranged in a rear area of the vehicle and comprises at least one central main air guiding element which can be displaced from a moved-in inoperative position into a moved-out operative position, lateral auxiliary air guiding elements being displaceable together with the or each central main air guiding element.

DE 30 19 150 A1 shows a vehicle air guiding system arranged in an upper rear area of the vehicle and having an air guiding element that can be displaced from an inoperative position, in which it is integrated in the shaping of the rear area flush with the surface, into a moved-out operative position. The air guiding element is constructed as an aerofoil which, by way of an operating device, can be displaced or changed from the inoperative position into the operative position and vice-versa.

DE 43 05 090 A1also discloses a vehicle air guiding system arranged in a rear area of the vehicle and has an air guiding element which can be displaced from an inoperative position into a moved-out operative position. The air guiding element is formed by a rear spoiler arranged in a recessed receiving device of the vehicle body and can be displaced by an operating device between the inoperative position and the operative position.

The air guiding systems known from DE 30 19 150 A1 and DE 43 05 090 A1, increase the rear axle output coefficient ($c_{ah}$-value) of the motor vehicle while maintaining the drag coefficient ($c_w$-value) at the same level or improving same. Each of these known air guiding elements have the same transverse dimension in the inoperative position and in the operative position.

DE 10 2005 030 203 discloses a vehicle air guiding system that has a central main air guiding element as well as two lateral auxiliary air guiding elements. The auxiliary air guiding elements allow the transverse dimension of the air guiding system can be enlarged in the operative position. The effective aerodynamic flow face area of the air guiding system can thereby be enlarged in the operative position, whereby particularly the rear axle output coefficient can be further increased. The lateral auxiliary air guiding elements are used only for enlarging the transverse dimension of the main air guiding elements or of the air guiding system.

An object of the present invention is to provide an improved vehicle air guiding system in which the lateral auxiliary air guiding elements, while enlarging the transverse dimension and simultaneously enlarging the longitudinal dimension of the main air guiding element or of the air guiding system, can be displaced from an also moved-in inoperative position into an also moved-out operative position. The simultaneous enlarging of the transverse dimension and of the longitudinal dimension of the main air guiding element or of the air guiding system is aerodynamically particularly advantageous.

Preferably, each of the lateral auxiliary air guiding elements can be changed by way of one operating device respectively transversely to the longitudinal direction of the vehicle as well as simultaneously in the longitudinal direction of the vehicle and thereby diagonally toward the rear from the inoperative position into the operative position, isochronously or simultaneously with the displacement of the lateral auxiliary air guiding elements diagonally toward the rear. Each of the lateral auxiliary air guiding elements is swivelable upward by way of an erecting device, and the central main air guiding element is coupled to the lateral auxiliary air guiding elements by way of a coupling device such that isochronously or simultaneously with the displacement of the lateral auxiliary air guiding elements, the central main air guiding element can be swiveled upward during the change from the inoperative position into the operative position.

Other objects, advantages and novel features of the present invention will become apparent from the following detailed description of the invention when considered in conjunction with the accompanying drawings.

DETAILED DESCRIPTION OF THE INVENTION

Figure 1:
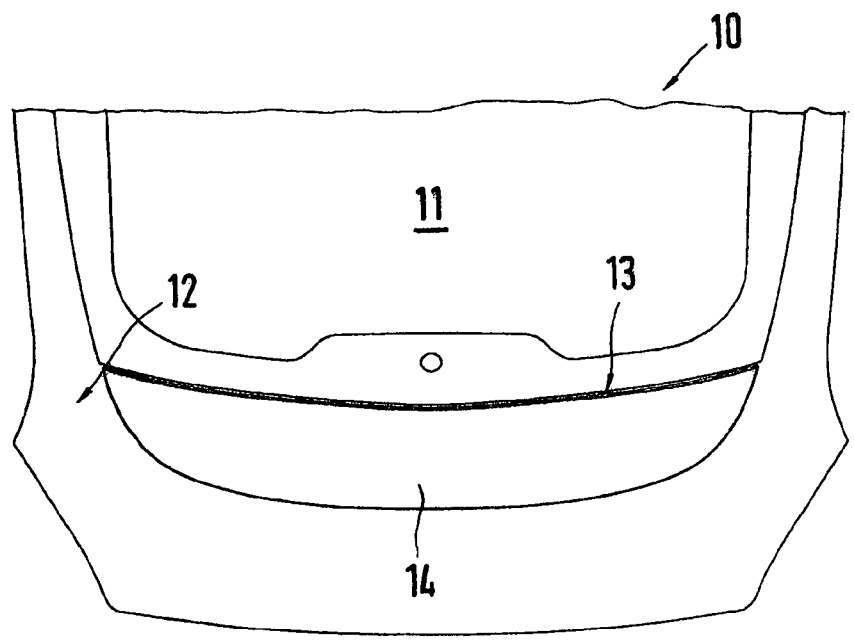
FIG. 1 is a plan view of a rear area of a vehicle with an air guiding system shown in the inoperative position.

FIGS. 1 to 8 show different views of a vehicle body rear area 10 comprising a rear window 11 surrounded by a vehicle body part 12 in the front, the rear as well as on the sides. An air guiding system 13 is positioned in a rearward area of the vehicle body part 12 of the rear area 10 configured as a fastback and therefore below the rear window 11. FIGS. 1, 3, 5 and 7 show the air guiding system 13 in an inoperative position, and FIGS. 2, 4, 6 and 8 show the latter in an operative position.

In the inoperative position, FIGS. 1, 3, 5, 7, the air guiding system 13 is integrated flush with the surface in the rear area 10 of the vehicle. In contrast, in the operative position, FIGS. 2, 4, 6, 8, the air guiding system 13 is moved out of the surface contour of the rear area 10.

The illustrated air guiding system 13 according to the invention has a central main air guiding element 14 as well as two lateral auxiliary air guiding elements 15, 16 that are visible only in the operative position (FIGS. 2, 4, 6, 8) of the air guiding system 13. In the inoperative position, the lateral auxiliary air guiding elements 15, 16 are displaced completely under the central main air guiding element 14 integrated in the inoperative position into the surface of the shaping of the rear area 10.

Figure 2:
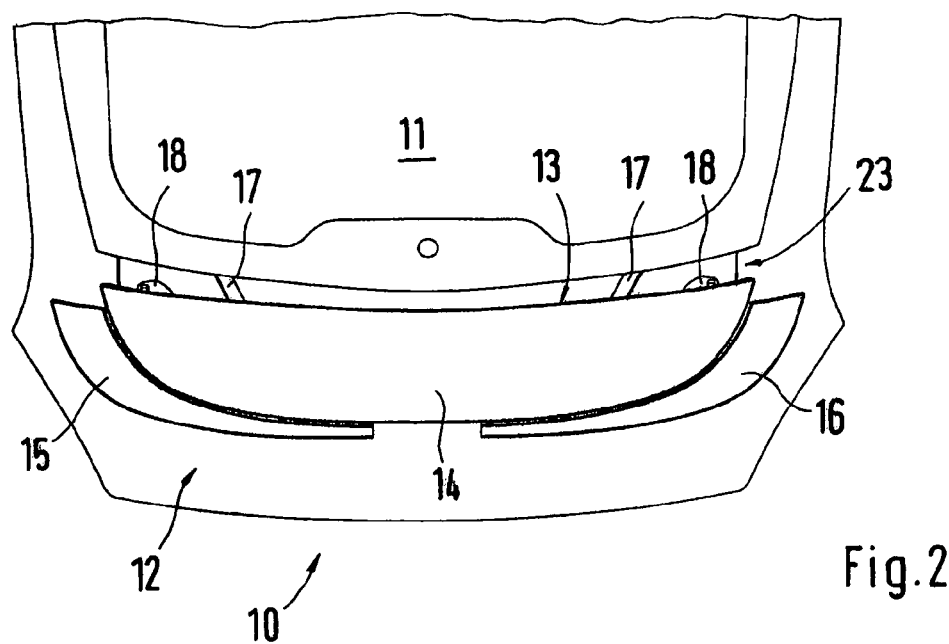
FIG. 2 is a view analogous to FIG. 1 but with the air guiding system shown in the operative position.
Figure 3:
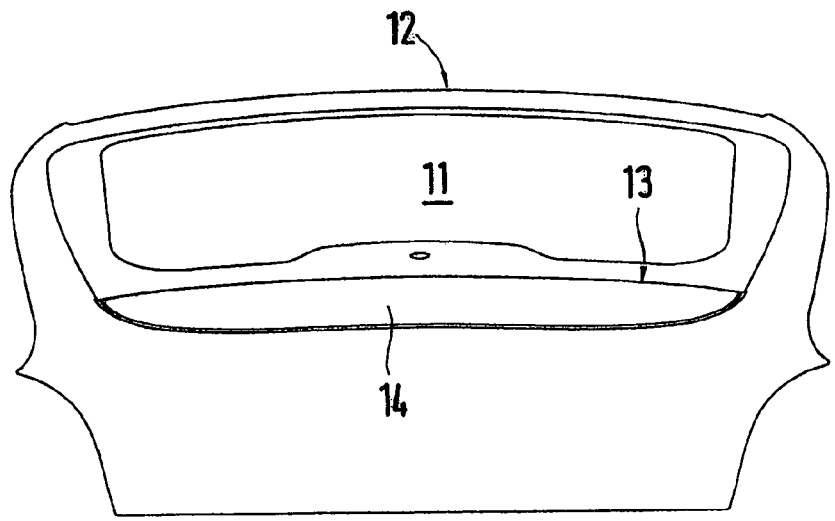
FIG. 3 is a rear view of the rear area of FIGS. 1 and 2 but with the air guiding system shown in the inoperative position.
Figure 6:
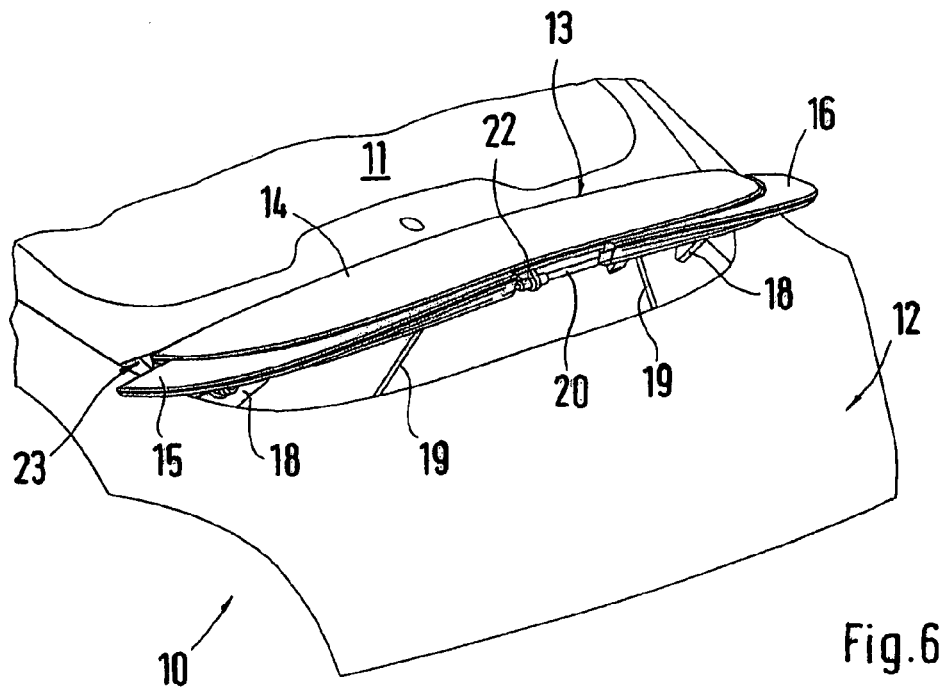
FIG. 6 is a view analogous to FIG. 5 but with the air guiding system shown in the operative position.
Figure 7:
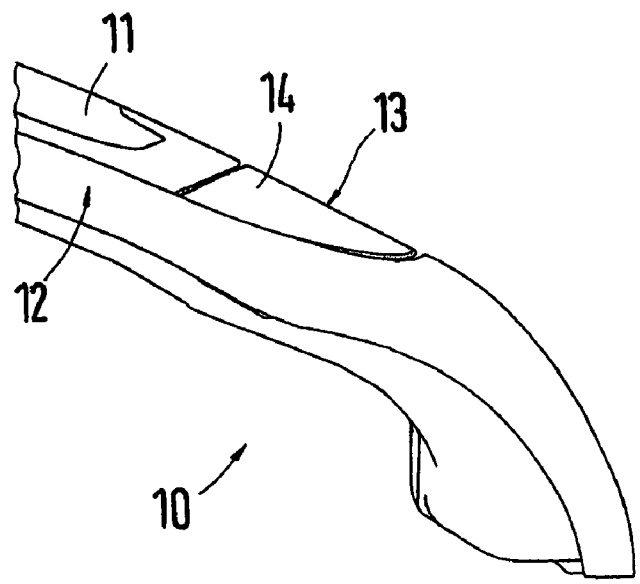
FIG. 7 is a side view of the rear area of FIGS. 1 to 6 with the air guiding system in the inoperative position.
Figure 8:
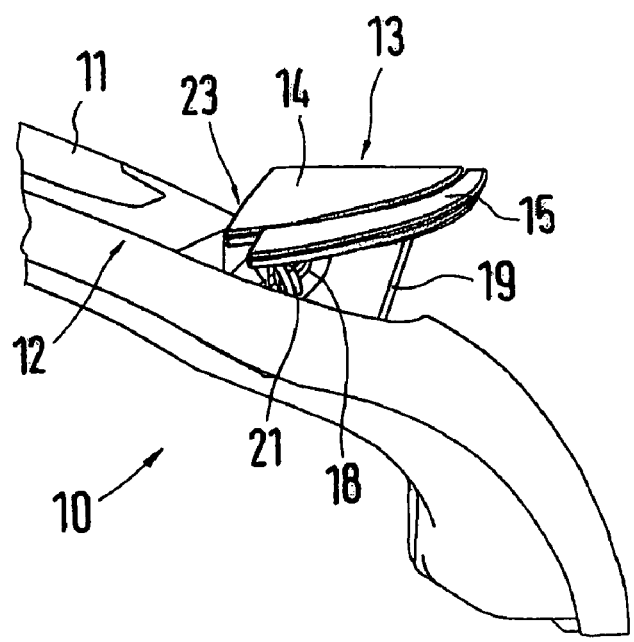
FIG. 8 is a view analogous to FIG. 7 but with the air guiding system shown in the operative position.
Figure 9:
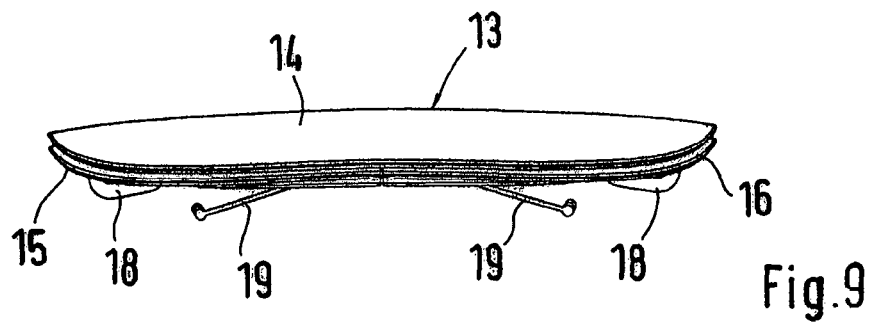
FIG. 9 is a perspective rear view of the air guiding system of FIGS. 1 to 8 shown in the operative position.

As best illustrated in FIGS. 2 and 6, the lateral auxiliary air guiding elements 15, 16 are constructed such that, during the change, they can be displaced from the inoperative position into the operative position while simultaneously enlarging the transverse dimension and the longitudinal dimension of the air guiding system 13 or of the main air guiding element 14. As a result, the effective aerodynamic flow face of the air guiding system 13 is enlarged in two dimensions, specifically, on the one hand, transversely to the longitudinal dimension and, on the other hand in the longitudinal dimension of the vehicle.

By way of one operating device respectively, each of the lateral auxiliary air guiding elements 15, 16 can be moved from the inoperative position into the operative position diagonally toward the rear and therefore transversely with respect to the longitudinal direction as well as in the longitudinal direction of the vehicle. In the illustrated embodiment, each of the operating devices comprises two operating elements 17, 18, which below are called operating rods but can also be called operating guide rods.

On the one side, the operating rods 17, 18 are articulatingly connected with the respective auxiliary air guiding element 15, 16 respectively and, on the other side, with the vehicle body part 12. The connection of the operating rods 17, 18 with the lateral auxiliary air guiding elements 15, 16 preferably takes place by wall of ball joints.

At mutually opposite ends, the operating rods 17, 18 are articulatingly connected with the vehicle body part 12, specifically either directly or by way of vehicle-body-side mounting bases or a continuous mounting plate (not shown). At these mutually opposite ends of the operating rods 17,18, the joints are preferably constructed as pivots.

Coupled with the displacement of the lateral auxiliary air guiding elements 15, 16 diagonally toward the rear, each of the lateral auxiliary air guiding elements 15, 16 can be isochronously or simultaneously swiveled upward by one erecting device respectively.

In the illustrated embodiment, each of the erecting devices comprises an erecting element 19 below is called an erecting rod. Each erecting rod 19 is, on the one side, articulatingly connected with the respective auxiliary air guiding element 15, 16 and, on the other side, with the vehicle body part 12 or with the vehicle-body-side mounting base or mounting plate of the auxiliary air guiding element (not shown), specifically in each case by way of ball joints. The erecting element 19 can also be called an erecting guide rod.

Figure 4:
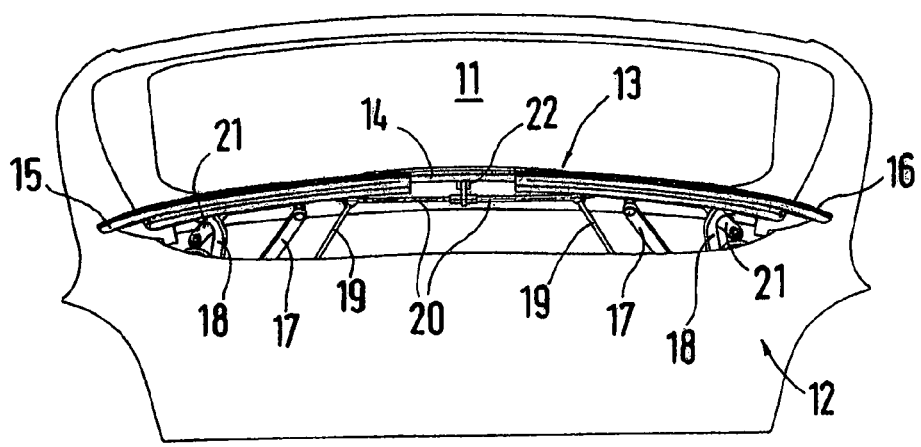
FIG. 4 is a view analogous to FIG. 3 but with the air guiding system shown in the operative position.
Figure 5:
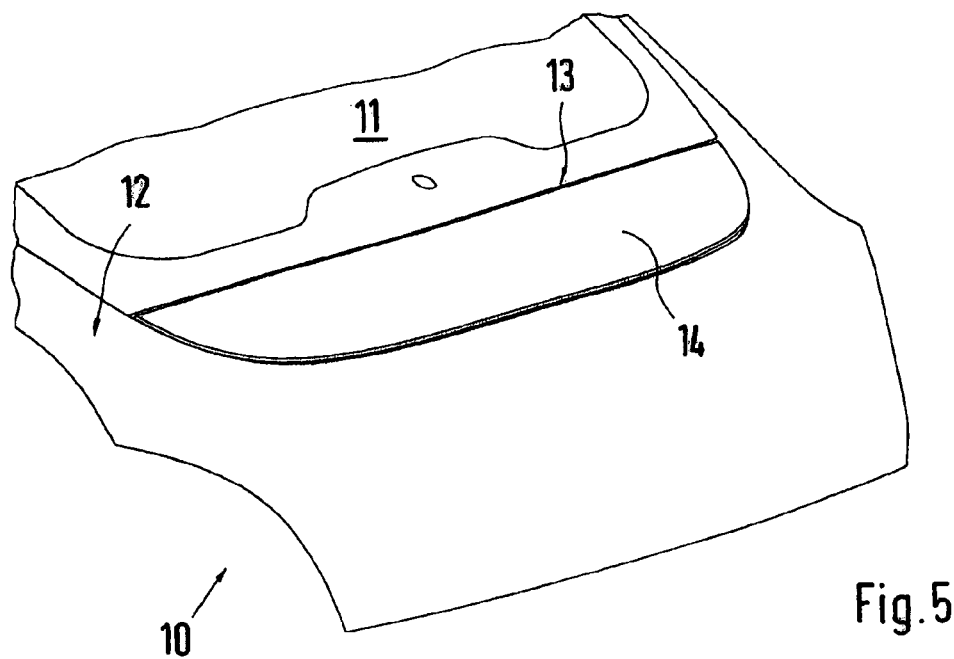
FIG. 5 is a perspective view diagonally from the rear of the rear area illustrated in FIGS. 1 to 4 but with the air guiding system shown in the operative position.
Figure 11:
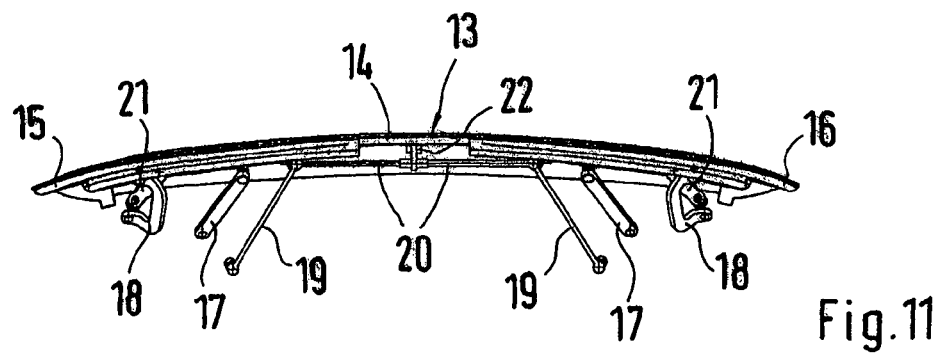
FIG. 11 is a rear view of the air guiding system of FIGS. 1 to 8 shown in the operative position.

As best illustrated in FIGS. 4 and 11, the erecting elements or erecting rods 19 of the two lateral auxiliary air guiding elements 15, 16 are connected with one another by way of a crossbar 20. The crossbar 20 is applied to the joint positions between the erecting rods 19 and the respective auxiliary air guiding element 15, 16 respectively, which joint points are constructed as ball joints.

The displacement of the central main air guiding element 14 is coupled to the above-described displacement of the lateral auxiliary air guiding element 15, 16, that are characterized by a simultaneously adjustment diagonally toward the rear and a swiveling in the upward direction during the change from the inoperative position into the operative position, such that, simultaneously with the displacement of the lateral auxiliary air guiding elements 15, 16, the main air guiding element 14 can be swiveled upward during the change from the inoperative position into the operative position.

For the foregoing purpose, the central main air guiding element 14 is coupled by way of a coupling device with the lateral auxiliary air guiding elements 15, 16. Thus, the central main air guiding element 14 is articulatingly connected by way of one coupling element 21 respectively (see particularly FIGS. 4, 11) with the lateral auxiliary air guiding elements 15, 16, in which case a further coupling element 22 couples the main air guiding element 14 with the crossbar 20 connecting the erecting rods 19. The coupling elements 21, 22 cause the central main air guiding element 14, in a manner synchronized with respect to the lateral auxiliary air guiding elements 15, 16 during the change from the inoperative position into the operative position, to be lifted by swiveling, or during the change from the operative position into the inoperative position, is lowered by swiveling. The coupling elements 21, 22 can also be called coupling rods or coupling guide rods.

Figure 10:
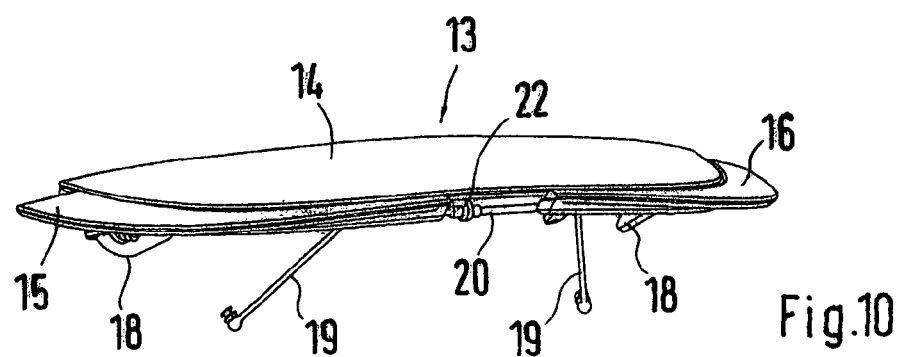
FIG. 10 is a perspective view diagonally from the rear of the air guiding system to FIGS. 1 to 8, but shown in the operative position.

According to an advantageous further development of the present invention, an indentation is made in forward sections of the auxiliary air guiding elements 15, 16. The indentation is adapted to a rear edge contour of the central main air guiding element 14, in the operative position, with rear sections of the central main air guiding elements 14 engaging in this indentation. As a result, the lateral auxiliary air guiding elements 15, 16 laterally as well as at the rear in a manner flush with the surface, enlarge the central main air guiding element 14. This is illustrated in FIGS. 6 and 10 for the right lateral auxiliary air guiding element 16. In contrast, this indentation is not shown for the left lateral auxiliary air guiding element 15, so that a step is formed between the central main air guiding element 14 and the left lateral auxiliary air guiding element 15.

Figure 12:
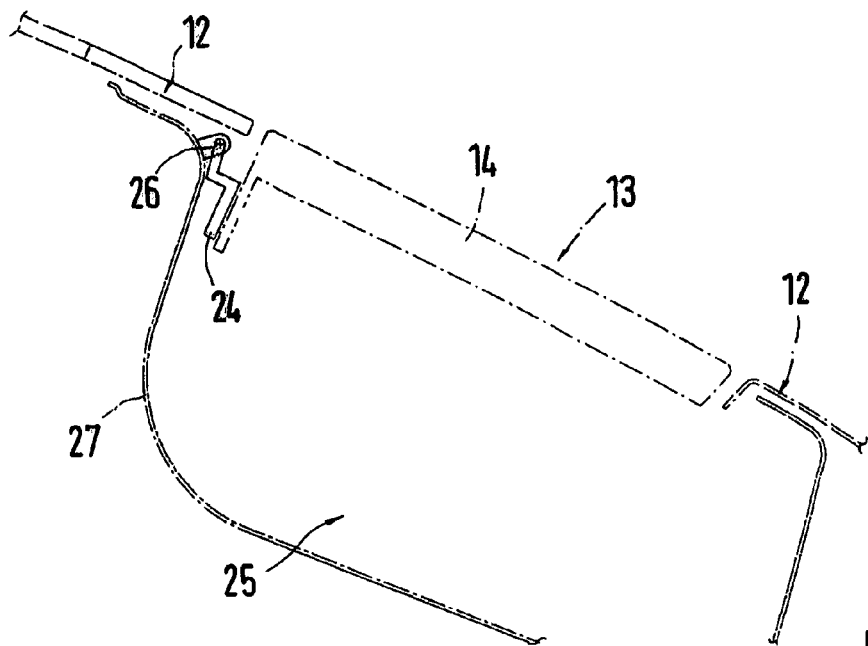
FIG. 12 is a schematic diagram view of the rear area of FIGS. 1 to 8 but with the air guiding system shown in the inoperative position.
Figure 13:
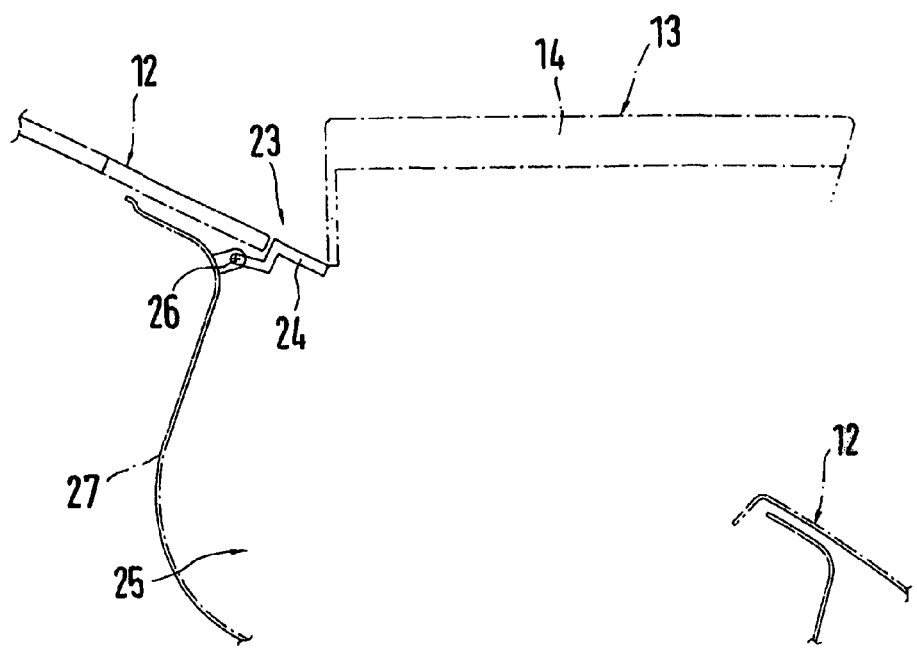
FIG. 13 is a cross-sectional view analogous to FIG. 12 but with the air guiding system shown in the operative position.

As best illustrated in FIG. 2, a gap 23 is provided between the central main air guiding element 14 and the vehicle body part 12 during the displacement of the central main air guiding element 14 from the inoperative position into the operative position. This gap 23 has to be closed for aerodynamic reasons. For this purpose, the closing element 24 can be used which is illustrated in FIGS. 12 and 13 and which is constructed as a swivelable flap. When the air guiding system 13 has moved into the operative position (see FIG. 13), the closing element 24 is swiveled upward in order to close the gap 23.

In contrast, when the main air guiding element 14 has moved into the inoperative position (see FIG. 12), the closing element 24 is folded into a receiving space 25 for the air guiding system 13. According to FIGS. 12 and 13, the flap-type closing element 24 is connected for this purpose by way of a joint 26 with a wall 27 bounding the receiving space 25.

Figure 14:
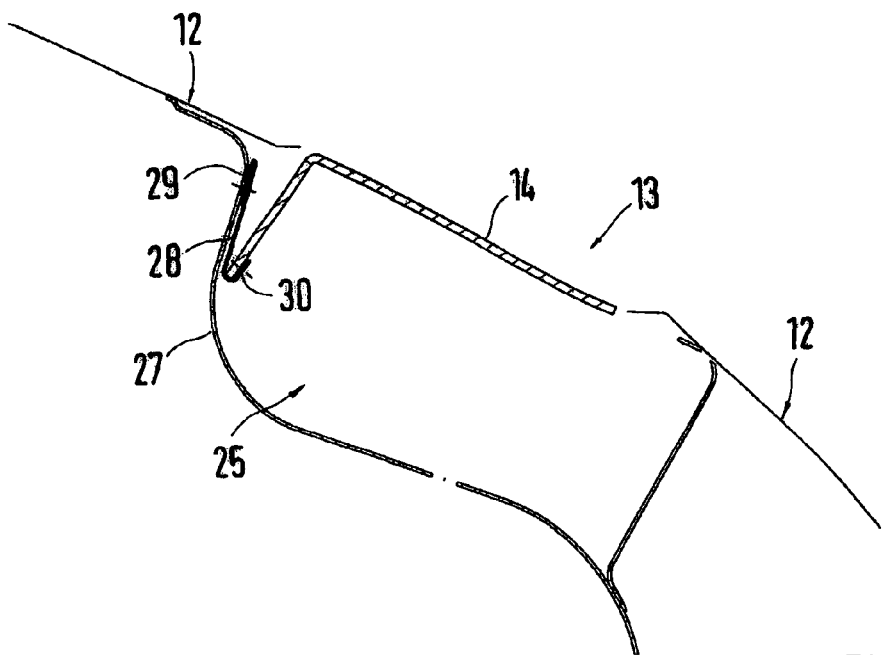
FIG. 14 is an alternative schematic cross-sectional view of the rear area of FIGS. 1 to 8 with the air guiding system shown in the inoperative position.
Figure 15:
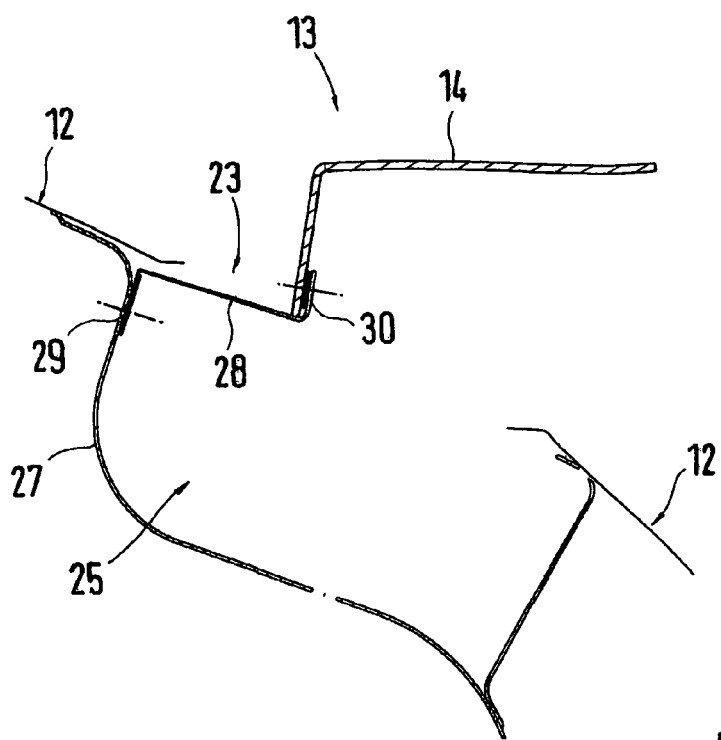
FIG. 15 is a cross-sectional view of FIG. 14 but with the alternative air guiding system in the operative position.

One alternative embodiment of a closing element 28 for the gap 23 between the forward end of the air guiding system 13 and the vehicle body section 12 is shown in FIGS. 14 and 15. There the closing element 28 is a flexible closing strip made of a textile material or of a rubber-type material. The flexible closing strip 28 is fixedly connected with the wall 27 bounding the receiving space 25 on a section 29. The closing element 28 rests by way of an opposite section 30 on the main air guiding element 14.

Figure 16:
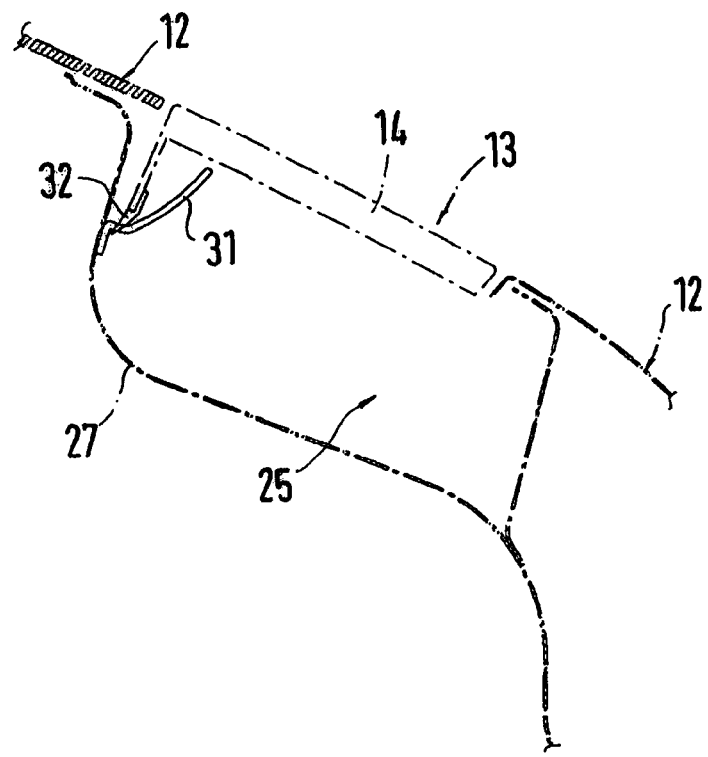
FIG. 16 is another alternative schematic cross-sectional view of the rear area of FIGS. 1 to 8 with the air guiding system in the inoperative position.
Figure 17:
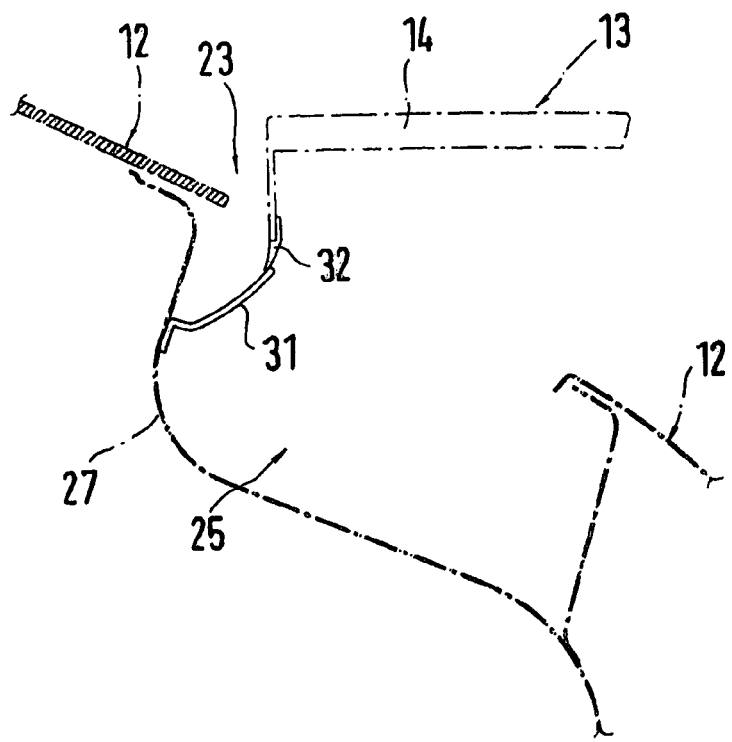
FIG. 17 is a cross-sectional view of FIG. 16 with the air guiding system shown in the operative position.

FIGS. 16 and 17 illustrate another alternative embodiment of a closing element 31 for the gap 23 between the forward end of the air guiding system 13 and the vehicle body section 12. There the closing element 31 is an element fixed to the vehicle body, and interacts with a sealing lip 32 associated with the main air guiding element 14. In any position of the main air guiding element 14, the sealing lip 32 rests against the vehicle-body-fixed closing element 31 for sealing the gap 23.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle air guiding system arranged in a vehicle rear area, comprising at least one central main air guiding element displaceable between a moved-in inoperative position and a moved-out operative position, and lateral auxiliary air guiding elements displaceable together with the at least one central main air guiding element, wherein the lateral auxiliary air guiding elements are arranged to be displaced while enlarging a transverse dimension and simultaneously enlarging a longitudinal dimension of the at least one central main air guiding element or of the air guiding system from an also moved-in inoperative position into an also moved-out inoperative position.

2. The vehicle air guiding system according to claim 1, wherein each of the lateral auxiliary air guiding elements is arranged to be changed or displaced by an operating device, respectively, transversely to a longitudinal direction of the vehicle and simultaneously, relative to the longitudinal direction of the vehicle, diagonally toward the rear from the inoperative position into the operative position.

3. The vehicle air guiding system according to claim 2, wherein each operating device comprises at least two operating elements having one side articulatingly connected with a respective one of the auxiliary air guiding elements and another side articulatingly connected with a vehicle body part.

4. The vehicle air guiding system according to claim 2, wherein each of the lateral auxiliary air guiding elements is arranged to be swiveled upward by an erecting device respectively coupled with the displacement of the lateral auxiliary air guiding elements diagonally toward the rear.

5. The vehicle air guiding system according to claim 4, wherein each operating device comprises at least two operating elements having one side articulatingly connected with a respective one of the auxiliary air guiding elements and another side articulatingly connected with a vehicle body part.

6. The vehicle air guiding system according to claim 4, wherein each erecting device comprises at least one erecting element having one side articulatingly connected with a respective one of the auxiliary air guiding elements and another side articulatingly connected with a vehicle body part.

7. The vehicle air guiding system according to claim 6, wherein the respective erecting devices are mutually connected by a crossbar operatively applied to joint positions between the erecting elements and the respective one of the auxiliary air guiding elements.

8. The vehicle air guiding system according to claim 1, wherein the at least one central main air guiding element is operatively coupled to the lateral auxiliary air guiding elements by way such that, simultaneously with displacement of the lateral auxiliary air guiding elements, the at least one central main air guiding element is arranged to be swiveled upward during the change or displacement from the inoperative position into the operative position.

9. The vehicle air guiding system according to claim 8, wherein each of the lateral auxiliary air guiding elements is arranged to be changed or displaced by an operating device, respectively, transversely to a longitudinal direction of the vehicle and simultaneously, relative to the longitudinal direction of the vehicle, diagonally toward the rear from the inoperative position into the operative position.

10. The vehicle air guiding system according to claim 9, wherein each operating device comprises at least two operating elements having one side articulatingly connected with a respective one of the auxiliary air guiding elements and another side articulatingly connected with a vehicle body part.

11. The vehicle air guiding system according to claim 8, wherein each of the lateral auxiliary air guiding elements is arranged to be swiveled upward by an erecting device respectively coupled with the displacement of the lateral auxiliary air guiding elements diagonally toward the rear.

12. The vehicle air guiding system according to claim 11, wherein each erecting device comprises at least one erecting element having one side articulatingly connected with a respective one of the auxiliary air guiding elements and another side articulatingly connected with a vehicle body part.

13. The vehicle air guiding system according to claim 12, wherein the respective erecting devices are mutually connected by a crossbar operatively applied to joint positions between the erecting elements and the respective one of the auxiliary air guiding elements.

14. The vehicle air guiding system according to claim 8, wherein the at least one central main air guiding element is coupled by way of a respective coupling element with the lateral auxiliary air guiding elements and by a further coupling element with the crossbar operatively connecting the erecting elements.

15. The vehicle air guiding system according to claim 1, wherein in the inoperative position, the lateral auxiliary air guiding elements are arranged to be displaced into a position below the at least one central main air guiding element so as not to be visible.

16. The vehicle air guiding system according to claim 1, wherein in forward sections, the lateral auxiliary air guiding elements have an indentation adapted to a rear edge contour of the at least one central main air guiding element, and in the operative position, rearward sections of the at least one central main air guiding element are arranged to engage in the indentation, with the lateral auxiliary air guiding elements thereby enlarging the at least one central main air guiding element flush with a surface of the at least one central main air guiding element.

17. The vehicle air guiding system according to claim 16, wherein each of the lateral auxiliary air guiding elements is arranged to be changed or displaced by an operating device, respectively, transversely to a longitudinal direction of the vehicle and simultaneously, relative to the longitudinal direction of the vehicle, diagonally toward the rear from the inoperative position into the operative position.

18. The vehicle air guiding system according to claim 17, wherein each operating device comprises at least two operating elements having one side articulatingly connected with a respective one of the auxiliary air guiding elements and another side articulatingly connected with a vehicle body part.

19. The vehicle air guiding system according to claim 1, wherein a gap occurs between a vehicle body part and a forward end of the at least one central main air guiding element during the displacement of the at least one central main air guiding element from the inoperative position into the operative position, and a closing element is arranged close to the gap.

20. The vehicle air guiding system according to claim 19, wherein each of the lateral auxiliary air guiding elements is arranged to be changed or displaced by an operating device, respectively, transversely to a longitudinal direction of the vehicle and simultaneously, relative to the longitudinal direction of the vehicle, diagonally toward the rear from the inoperative position into the operative position.

* * * * *